United States Patent [19]

Sweere

[11] 4,453,687

[45] Jun. 12, 1984

[54] SWIVEL/TILT MOUNTING DEVICE FOR A CATHODE RAY TUBE

[76] Inventor: Harry C. Sweere, 5637 Woodlawn Blvd., Minneapolis, Minn. 55417

[21] Appl. No.: 353,015

[22] Filed: Mar. 1, 1982

[51] Int. Cl.³ ............................................ F16M 11/12
[52] U.S. Cl. ..................................... 248/183; 248/51; 188/251 M
[58] Field of Search ................. 248/183, 661, 122, 51, 248/184, 185, 186; 297/374; 188/83, 166, 251 R, 251 A, 251 M; 74/531

[56] References Cited

U.S. PATENT DOCUMENTS

| | | | |
|---|---|---|---|
| D. 159,625 | 8/1950 | Johnson | 248/51 X |
| 1,274,317 | 7/1918 | Palmenberg | 248/185 |
| 1,774,742 | 9/1930 | Ash | 248/51 |
| 2,261,426 | 11/1941 | Willcox | 248/183 |
| 2,459,676 | 1/1949 | Axtell | 248/183 |
| 2,857,030 | 10/1958 | Samo | 188/251 M |
| 4,247,069 | 1/1981 | Kurz | 248/183 X |
| 4,344,615 | 8/1982 | Carlson | 188/251 A X |
| 4,351,423 | 9/1982 | Rogier | 188/166 X |

Primary Examiner—Ramon S. Britts
Assistant Examiner—Sarah A. Lechok
Attorney, Agent, or Firm—Williamson, Bains, Moore & Hansen

[57] ABSTRACT

A device designed for mounting cathode ray tube has the ability to both tilt and swivel in order to provide a most advantageous angle at a working station. A cross-piece is rotatably mounted in a base and a mounting plate is designed to tilt about the cross-piece, there being a frictional engagement between the cross-piece and a portion of the mounting plate. This frictional engagement has provision for varying the amount of friction so as to lock or allow varying difficulty of tilt depending on the weight of the device to be mounted and the desire of the operator. The device is designed for one-handed operation.

10 Claims, 8 Drawing Figures

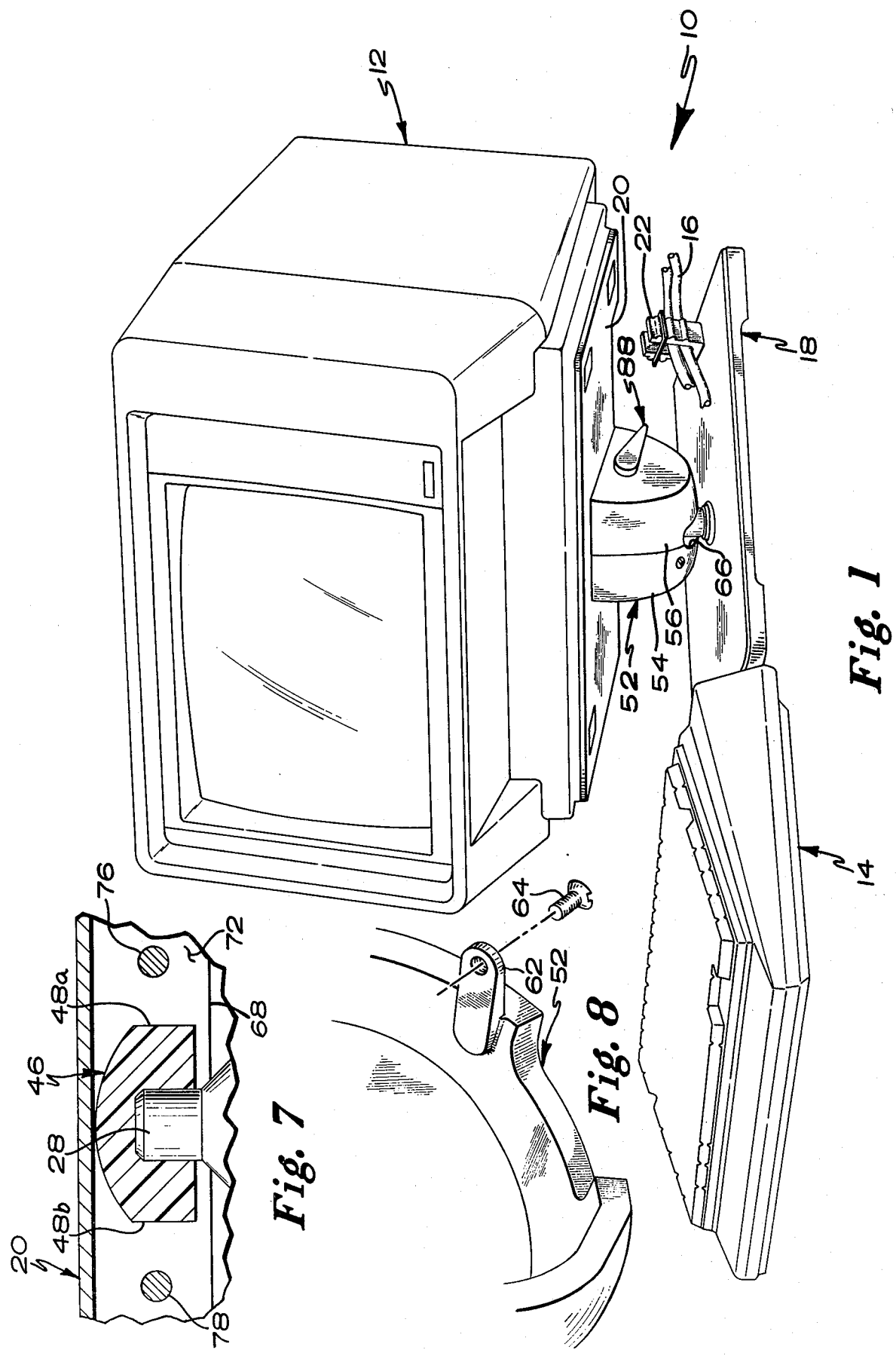

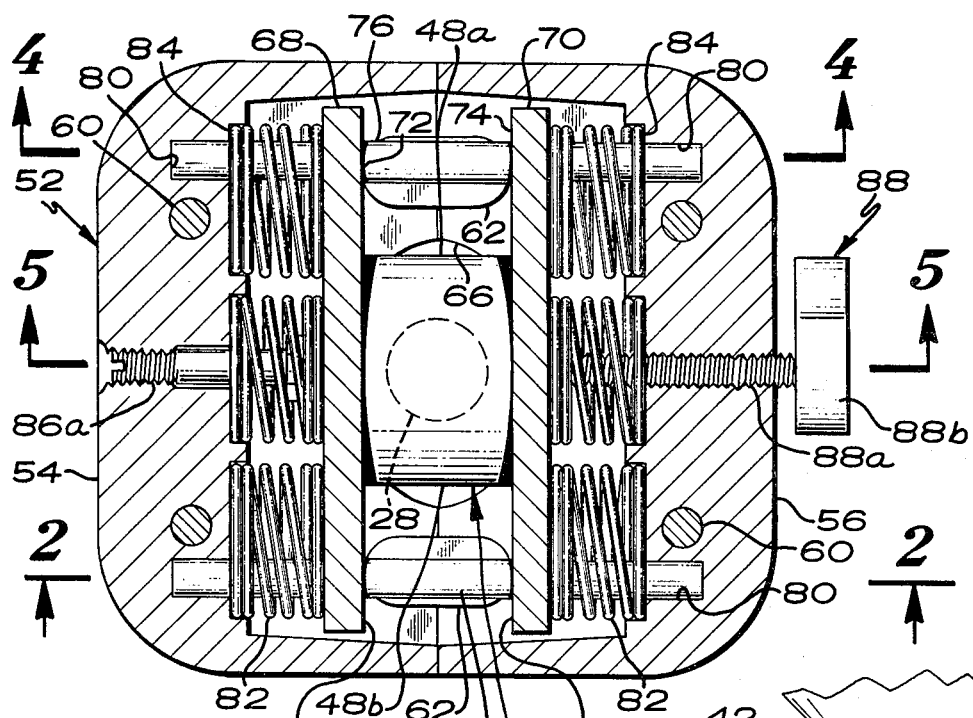

SWIVEL/TILT MOUNTING DEVICE FOR A CATHODE RAY TUBE

BACKGROUND OF THE INVENTION

In today's business environment, operation of a cathode ray tube (CRT) incorporated in a computer, word processor or other device is recognized as being highly stressfull. It is therefore an object of this invention to provide a device which will hopefully lessen the stress associated with such operation. One way of doing so is to be able to locate the CRT at the viewing angle most appropriate to and desired by the individual user. Previous efforts in this direction has been of a "lazy susan" type wherein the CRT or the entire terminal is placed on a simple swivel base. Another example of a prior effort allows some tilting by means of the CRT having a convex lower surface mating with a concave upper surface on a base to allow tilting. This construction, however, is not easily operated, has a substantial degree of friction and generally requires two hands to perform the tilting operation. In addition, such instruction does not allow for locking in any particular position if desired.

It is, therefore, an object of this invention to provide a mounting position for a CRT which allows the CRT to be tilted and rotated and which allows for such operations to be performed easily with one hand. It is further an object of this invention to allow use of a single CRT at multiple work stations by allowing a one handed swivel and tilt to take place simultaneously. It is further an object of this invention to provide such a device with a smooth hydraulic-like feel which results from the similar static and dynamic coefficients of friction of the friction materials chosen.

SUMMARY OF THE INVENTION

In the instant invention, a base plate carries a rotatably mounted cross-piece thereon which may be an automotive U-joint or similar design. One arm of the cross-piece is carried in the base while the upper arm carries a first friction block which is desireably constructed of ultra-high molecular weight polyethylene. Two side plates are mounted to the two cross-arms of the cross-piece and rotate about the cross-arms. A pair of guide bars are provided which pass from one side plate to the other and carry, slideably mounted thereon, two steel friction plates. Each friction plate presses against one side of the friction block. The two guide rods are located on either side of the friction block and serve to limit the tilting travel of the side plates and product which is to be mounted. A number of springs are located between each friction plate and its associated side plate serving to urge the friction plate against the friction block. Springs are located in counter-sunk depressions in the side plates to positively locate the springs. The number of springs may be varied according to the weight of the product to be mounted. A stop bolt is threadingly engaged into one side plate and serves to limit the travel of one of the friction plates. The other side plate carries a clamping lever which is threadingly engaged with the side plate and which bears against the other friction plate. By adjusting the clamping lever, the force urging the one friction plate against the friction block is varied and the amount of force required for tilting is varied from extremely light to a solid lock. The block, as mentioned previously is constructed of ultra-high molecular weight polyethylene and in conjunction with the steel friction plates provides a unique hydraulic-like feel to the frictional braking mechanism.

These and other objects and advantages of my invention will appear more fully from the following description made in conjunction with the accompanying drawings wherein like reference characters refer to the same or similar parts throughout the several views.

BRIEF DESCRIPTION OF THE DRAWINGS

FIG. 1 is a perspective view showing a CRT mounted on the instant invention.

FIG. 2 is a sectional view taken along line 2—2 of FIG. 3.

FIG. 3 is a sectional view taken along line 3—3 of FIG. 2

FIG. 6 is a cut-away view of the base swivel unit.

FIG. 7 is a sectional view taken along line 7—7 of FIG. 5.

FIG. 8 is a perspective view showing the housing construction.

DESCRIPTION OF THE PREFERRED EMBODIMENTS

Figure 4:
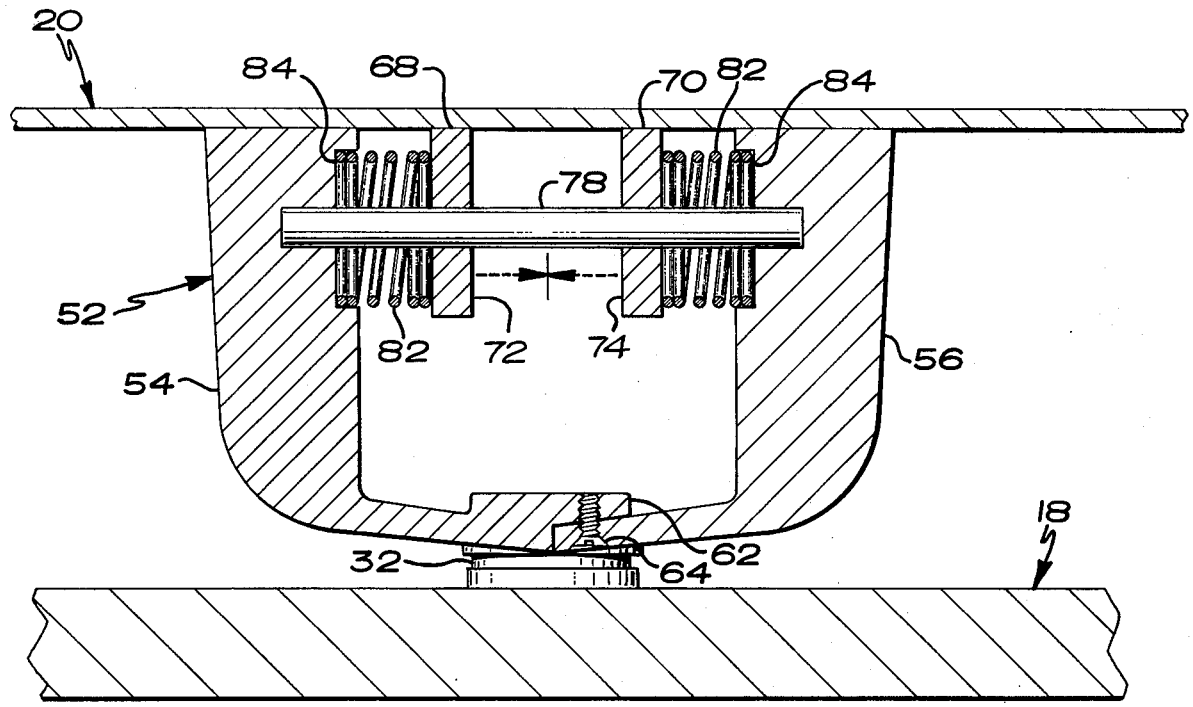
FIG. 4 is a sectional view taken along line 4—4 of FIG. 3.
Figure 5:
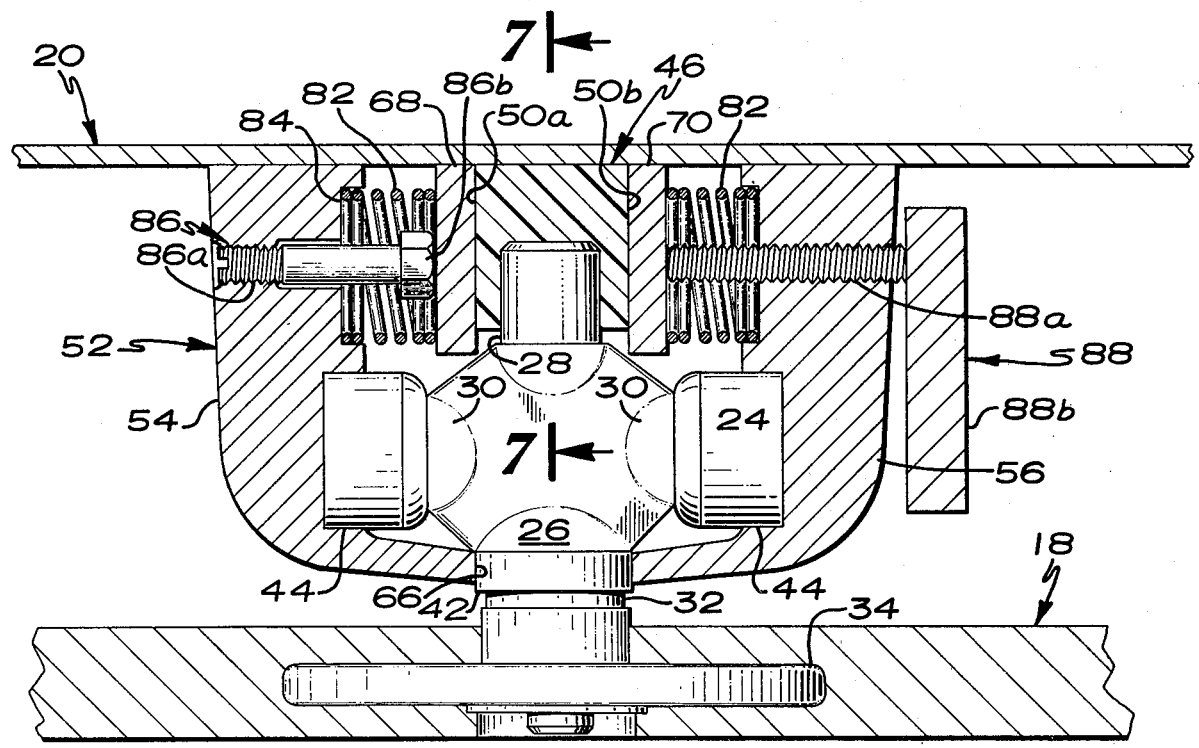
FIG. 5 is a sectional view taken along line 5—5 of FIG. 3.

The instant invention 10 is designed for the mounting of a cathode ray tube (CRT) or other similar video display device so that it may be swiveled and/or tilted as desired. Typically, a separate keyboard unit 14 is associated with CRT 12. A cable 16 is generally associated with CRT 12 and in the prior art swivel devices has been allowed to flop about loosely during swiveling. This may have the effect of disturbing objects placed about the CRT 12 on a work surface. In the instant invention this problem is solved by mounting to base 18 a cable clamp 22 which only allows movement of the cable between clamp 22 and CRT 12. CRT 12 is mounted upon a mounting plate 20 which is in turn pivotably mounted on cross-piece 24 which is in turn swivelingly mounted on base 18. Cross-piece 24 is mounted for rotation in a first plane parallel to base 18 and CRT 12 is mounted for tilting in a second plane relative to cross-piece 24, the second plane being normal to the first plane. Cross-piece 24 is generally cruciform in shape and comprises a base arm 26, a top arm 28 and side arms 30. Cross-piece 24 may be an automotive U-joint which is readily and inexpensively available and which generally has the strength and durability substantially in excess of the requirements of the instant application.

Cross-piece base arm 26 is mounted in base 18 as shown particularly in FIG. 6. An oilite bearing 32 is engaged in a mounting plate 34 which is in turn cast or otherwise fastened into base 18. Base arm 26 rotates while oilite bearing 32 remains stationary. A top thrust washer 42 bears the vertical thrust component of the weight of CRT 12 and mounting plate 20. A bottom thrust washer 40 is located on the underside of mounting plate 34 which is recessed within base 18 as shown particularly in FIG. 2. Screw 38 passes through base washer 40 and is threaded into base arm 26 which has located therein an expander 36 which serves to lock screw 38 into base arm 26. Thus, screw 38 rotates in concert with base arm 26 at all times during swiveling.

Bearing cups 44 are rotatably mounted on cross-piece side arms 30 while cross-piece top arm 28 has located thereon friction block 46. Friction block 46 is desireably formed of ultra-high molecular weight polyethylene. The choice of this material for this particular application substantially differs from applications normally recognized for this material. Normal applications for UHMWPE are applications in which it is desired to minimize wear and friction. Friction block 46 has first and second end surfaces 48a and 48b respectively as well as first and second friction surfaces 50a and 50b respectively.

Housing 52 is formed of identical first and second halves 54 and 56 respectively which in the preferred embodiment may be the cast of aluminum or any other suitable material. In particular, screws 60 hold mounting plate 20 to first and second halves 54 and 56 as shown in FIG. 2. Tab 62 cooperates with screws 64 to hold the first half 54 and second half 56 in fixed position relative to one another. As can be seen from the drawings, there is no difference between first and second halves 54 and 56 other than the orientation of those parts. A slot 66 is formed in the bottom of housing 52 for the passage therethrough of cross-piece base arm 26. The ends of slot 66 may assist in limiting the travel of housing 52 relative to cross-piece 24.

First and second friction plates 68 and 70 have friction surfaces 72 and 74 respectively on the sides of friction plates 68 and 70 facing friction block 46. In particular, friction surface 72 is located in frictional contact with friction surface 50a and friction surface 74 is in frictional contact with friction surface 50b. Friction plates 68 and 70 are slidingly located on locating rods 76 and 78. Locating rods 76 and 78 contact friction block and surfaces 48a and 48b upon the limit of travel desired when that unit is tilted. Either the location of rods 76 and 78 may be varied or the shape of friction block 46 may be varied in order to provide the desired amount of tilt travel in the instant invention. Rods 76 and 78 are retained between housing first and second halves 54 and 56 in bores 80 which are located in the housing halves.

A plurality of springs 82, most desireably of the coil type, are utilized in order to provide the pressure for the maintenance of frictional contact between plate 68 and 70 and block 46. Springs 82 are located in counter sunk depressions 84 located in housing halves 54 and 56. The number of springs may be varied from one to six (as shown, if desired even more springs may be designed in) depending upon the weight of the product to be mounted and the degree of friction braking required. Springs 82 serve to urge friction plate 68 and 70 toward each other and towards friction block 46.

A stop 86 is utilized to assist in positive locking and towards that end a bolt or similar item is provided having a threaded portion 86a threaded into first housing half 54 and a head portion 86b extending inwardly therefrom into close proximity with friction plate 68. Stop 86 may be adjusted so that head portion 86b is a short distance from friction plate 68 such that when the device is clamped as will be more fully explained hereinafter, friction plate 68 contacts head portion 86b.

Threadedly located in second housing half 56 is clamp 88 comprising a threaded portion 88a and a handle 88b located at the outward end thereof. When it is desired to increase the frictional clamping or braking over that already provided by springs 82, the operator need merely tighten handle 88b thereby pressing the threaded portion 88a of clamp 88 into contact with friction plate 70 thereby pressing friction plate 70 into contact with friction block 46. Depending on the degree to which clamp 88 is tightened, the frictional braking may be increased over that already provided by springs 82 or may in effect provide an absolute clamping preventing any movement of CRT 12 at all.

It is, of course, appreciated that the frictional braking mechanism of the instant invention may be applied in other applications.

While the preferred embodiments of the present invention have been described, it should be understood that various changes, adaptions and modifications may be made therein without departing from the spirit of the invention and the scope of the appended claims.

What is claimed is:

1. A swivel tilt mounting device for mounting a product, said device comprising:
   a base plate for placement on a supporting surface;
   a support plate for supporting said product;
   a first member rotatably mounted to one of said plates for allowing rotation in a first plane;
   a second member attached to the other said plate, said second member being rotatably attached to said first member and rotatable about an axis of rotation in a second plane substantially normal to said first plane;
   means for frictionally impeding rotation in said second plane, said friction means comprising:
      at least one friction piece attached to said first member and having at least one first friction surface;
      at least one friction piece attached to said second member and having at least one second friction surface; and
      means for pressing said first and second friction surfaces together in sliding relationship, said friction surfaces being spaced from said axis of rotation, one of said friction surfaces being of ultra-high molecular weight polyethylene and the other said surface being of metal.

2. A swivel tilt mounting device of claim 1, said friction means further comprising:
   guide means for slideably mounting one of said friction surfaces thereon.

3. A swivel tilt mounting device of claim 2, said first friction piece comprising two oppositely disposed first friction surfaces and two oppositely disposed end surfaces.

4. A swivel tilt mounting device of claim 3, said guide means comprising first and second rod means mounted to said second member, said rod means being spaced apart a distance greater than the distance between said end surfaces and contacting each said end surface at a predetermined point in said second plane, to define a limited rotational swing.

5. A swivel tilt mounting device of claim 4, said friction means comprising first and second plates each comprising a said second friction surface, said plates being mounted on said rod means on opposite sides of said first friction piece.

6. A swivel tilt mounting device of claim 5, said pressing means comprising at least one spring mounted between said second member and a said plate so as to urge said first and second friction surfaces together.

7. A swivel tilt mounting device of claim 6 wherein at least one said spring is mounted around said guide means.

8. A swivel tilt mounting device of claim 7 further comprising stop means for maintaining one of said plates in a predetermined relationship with said first friction piece.

9. A swivel tilt mounting device of claim 8 comprising clamp means for adjustably clamping the other said plate against said first friction piece and in turn said first friction piece against said one plate and said stop means.

10. A swivel tilt mounting device of claim 1 further comprising means for clamping to said base plate a cable extending from said product.

* * * * *